United States Patent
Plett

(10) Patent No.: US 6,726,396 B2
(45) Date of Patent: Apr. 27, 2004

(54) SHOCK ABSORBER FOR FIFTH WHEEL TRAILER HITCH

(76) Inventor: Benjamin Plett, Box 340, Rosenort, MB (CA), R0G 1W0

( * ) Notice: Subject to any disclaimer, the term of this patent is extended or adjusted under 35 U.S.C. 154(b) by 0 days.

(21) Appl. No.: 10/147,963

(22) Filed: May 20, 2002

(65) Prior Publication Data

US 2003/0214114 A1 Nov. 20, 2003

(51) Int. Cl.[7] ................................................ B62D 53/06
(52) U.S. Cl. ...................................... 403/365; 280/441
(58) Field of Search ................................ 403/279, 280, 403/282, 285, 367, 365; 280/441

(56) References Cited

U.S. PATENT DOCUMENTS

| 4,443,025 | A | | 4/1984 | Martin et al. |
|---|---|---|---|---|
| 4,960,288 | A | | 10/1990 | Chambers |
| 5,639,106 | A | | 6/1997 | Vitale et al. |
| 5,772,229 | A | | 6/1998 | Cattau |
| 6,170,850 | B1 | | 1/2001 | Works |
| 6,170,851 | B1 | | 1/2001 | Lindenman et al. |
| 6,182,996 | B1 | | 2/2001 | Koetter et al. |
| 6,349,748 | B1 | * | 2/2002 | Dodds et al. ............... 138/149 |
| 2001/0020776 | A1 | * | 9/2001 | Linger et al. ............... 280/441 |
| 2003/0034631 | A1 | * | 2/2003 | Lindenman et al. ..... 280/438.1 |
| 2003/0038452 | A1 | * | 2/2003 | Lindenman et al. ..... 280/438.1 |

* cited by examiner

Primary Examiner—John R. Cottingham

(57) ABSTRACT

A shock absorber for fifth wheel hitches for pickup trucks has a bushing embedded in memory polyurethane elastomer confined within a metal frame. The shock absorbers are mounted by brackets on the fifth wheel hitch support frame. The bushings receive pivot pins terminal to a cross beam mounting the couple assembly of the hitch. Both bushing and shock absorber frame have projections extending into the elastomer for better engagement. The projections can be studs or planar lugs. When the projections are loops of wire welded to the bushing and frame, the elastomer flows into the loops providing better engagement.

6 Claims, 3 Drawing Sheets

SHOCK ABSORBER FOR FIFTH WHEEL TRAILER HITCH

This invention relates to shock absorbers and bushings for the shock absorbers. The shock absorbers are for hitches for trailers on pickup trucks, tractor units and the like for towing larger trailers. In particular the invention relates to shock absorbers for fifth wheel hitches.

BACKGROUND

Fifth wheel trailer hitches are generally used to tow larger trailers (semi-trailers), where it is desired to locate the center of gravity of the trailer in a more forward position relative to the towing vehicle to improve weight distribution, stability and maneuverability. This fifth wheel type arrangement is well known in this connection, where the tractor element has a chassis with a large coupling shoe extending upwards to mate with a corresponding arrangement on the trailer. A smaller and lighter version is known for towing smaller trailers such as camping trailers, by pickup or other lighter trucks. Here a support frame is mounted to the truck chassis through the truck bed, extending generally upwards to hold a first truck coupling element. A second trailer coupling element extends downward from the forward end region of a trailer to releasably engage the first coupling element. The respective coupling elements may consist of a variety of suitable elements. For example, the truck coupling element may consist of a U-shaped plate mounted generally horizontally to mate with a downwards dependent shoe or ball or kingpin extending from the trailer. Alternatively the relative position of the two elements may be reversed. In the present invention, it is contemplated that any suitable engagement means may be provided at the point of engagement between the trailer and the truck-mounted element.

The invention comprises a bushing having external projections. It also comprises a resilient block held in a frame to form a shock absorbing element, having a cylindrical aperture to receive a pivot pin. Preferably there is a bushing fitting in the aperture to receive the pivot pin. Preferably the bushing has external projections, which together with the bushing are suitably embedded in a resilient block held in a frame to form a shock absorbing element. The shock absorber can be mounted by a bracket on a fifth wheel support frame to receive a pin pivotally mounting the fifth wheel. The structure of the fifth wheel coupling element, the way it is mounted on the support frame, the structure of the support frame, and the way the support frame is attached to the truck chassis through the truck bed, all have multiple possibilities, which while not identical in their effects are generally regarded as equivalents by those skilled in the art, although some are preferred. Alternatively the shock absorber is mounted by a bracket on a cross bar and receives a pin mounted on the support frame. As noted above the bushing may be absent and the pin received in an aperture in the resilient block. Generally the fifth wheel is mounted by a support frame, on the truck chassis through the truck bed, to receive a king pin on the trailer bottom.

Although the invention is described and referred to specifically as it relates to specific devices for bushings, and resilient shock absorber blocks within frames, and devices incorporating such specific devices, it will be understood that the principles of this invention are equally applicable to similar devices and structures for vehicle shock absorbers accordingly, it will be understood that the invention is not limited to such devices and structures for shock absorbers.

A drawback associated with conventional trailer mounting means relates to the high level of shock transmission between trailer and towing vehicle. For instance, when the trailer rides over a bump in the road, shock and displacement impact on the truck through the trailer hitch and vice versa. Such impact and shock transmission results in a rough ride as jolts and vibration are transmitted between trailer and truck, which also tends eventually to damage both vehicles and their contents. Thus, there is a need to provide a means to reduce impact between the trailer and the truck, thereby improving the ride of the towing vehicle and reducing damage to both trailer and truck and their contents.

A typical fifth wheel arrangement varies depending on whether it is integral to a tractor for a semi-trailer, or mounted on a pickup truck. Both variations typically have a truck fifth wheel hook assembly to receive a trailer kingpin. The main difference lies in the support structure which in a tractor for a semi-trailer has trunnions to support the rocker arm pivot pins. The trunnions are usually mounted directly on the tractor chassis. In a pickup truck a support frame is attached to the truck chassis, generally by bolts through the truck bed, with paired spaced apart upstanding arms or legs. The fifth wheel hook assembly is pivotally mounted on the support frame, generally by pivot pins which may be journalled for rotation in two apertures, sleeves or bushings within the support frame. Often the pins rest in U shaped brackets secured by a retaining bolt passed through two apertures in the U bracket. The pivot pins can be directly mounted on the fifth wheel assembly, or the fifth wheel assembly may be fixedly mounted on a cross beam or rocker arm with terminal pivot pins. The pivot pins may be rotatably received directly within support frame arms or legs, or by brackets upon a fixed cross beam, which may form a saddle bracket between support frame arms or legs. In all these arrangements the pivot pins could be mounted on the support frame and received within the fifth wheel coupling arrangement. In practice the pivot pins are usually part of the coupling arrangement. The pivot apertures are often mounted on brackets, which have a vertical array of apertures allowing height adjustable bolting to a similar array of apertures in the support frame arms or legs. The fifth wheel coupling element, or its beam or rocker arm that it is mounted on, rotates about its cross axis allowing pivotal movement in a vertical plane (difference in the angle of fore-aft inclination) between towing vehicle and trailer. The mount or hitch plate or coupler head of the fifth wheel coupling element receives a kingpin, shoe, ball, or other mounting element from the forward end region of the trailer. Generally in all trucks no shock absorber is provided for the fifth wheel hitch. Occasionally a double pivot hitch is used, allowing side to side pivoting of the hitch relative to its cross mounting. This adds a degree of flexibility at extra expense, but has no shock absorbing effect.

PRIOR ART

U.S. Pat. No. 6,182,966 B1 issued to Koetter et al. Feb. 6, 2001 teaches a fifth wheel hitch mounted by transverse pivot pins having thin bushings of plastic, which are themselves within compressed thin rubber inserts. Pins, plastic bushings and rubber inserts are held within a support recess and a complementary half clip. The pins can have a spherical end embedded within elastic material. The disclosed purpose is to allow limited swinging of the fifth wheel, and twisting of the vehicle frame and for easement of assembly, as the device is not manufactured by precision engineering. It also provides a tight fit for the pivot pins in their bushings. U.S. Pat. No. 6,170,850 B1 issued to Works Jan. 9, 2001, teaches polyurethane pivot bearings about metal pins, mounted atop pedestals for a fifth wheel hitch. The hitch has transverse projecting pivot saddles which engage the pivot bearings. Works provides single or paired side shock absorbers in the hitch head proper. Works' couple assembly is pivotally mounted on a bearing sleeve around a longitudinal pivot, allowing side to side pivoting. in the absence of shock absorber(s) the hitch would tend to cant to one side or the other. The shock absorber(s) keep the hitch level.

It is also desired to provide an improved means to permit relative rotary movement between a trailer and towing vehicle horizontally about the longitudinal axis of trailer and towing vehicle. When the trailer or towing vehicle experience a limited degree of yaw, it is desirable to permit a degree of freedom of movement about the longitudinal axis of the vehicles.

OBJECTS OF THE INVENTION

The principal object of the invention is to provide a shock absorber for a fifth wheel trailer hitch, which will absorb a considerable portion of shock or impact between the trailer and the towing vehicle. A subsidiary object is to provide a shock absorber which will accommodate movement in a vertical plane (pitching). Another subsidiary object is to provide a shock absorber which will accommodate movement in a horizontal plane (yawing)—pivotal movement between trailer and towing vehicle. A further subsidiary object is to provide a shock absorber which will accommodate rotational movement in a cross plane (rolling). In combination these objects provide a degree of shock absorption in three dimensions. A further subsidiary object is to provide a bushing having external projections for a pivot pin. A further subsidiary object is to provide a shock absorber having a frame containing a resilient material having therein a cylindrical aperture to receive a pivot pin. A further subsidiary object is to provide a bushing embedded in said cylindrical aperture. A further subsidiary object is to provide a fifth wheel hitch mounted on support arms or legs attached to a truck chassis through the truck bed, said fifth wheel hitch being mounted by pivot pins inserted into bushings embedded in resilient material contained in a frame. Other objects of the invention will be apparent to those skilled in the art from the following specification, appended claims and accompanying drawings.

DESCRIPTION OF THE INVENTION

In one prototype the invention was tested with bushings embedded in resilient material contained in a metal frame. It was found to work. However while frame and bushing bonded during molding of the resilient material, during cooling there was fractional shrinkage. The bushing came loose from the resilient material, probably, it is thought, because the area of resilient material-frame bonding was much greater than the area of bushing-resilient material bonding. In practice this meant that only the bottom of the bushing engaged the resilient material. This reduced the shock absorber effect, since only compression of resilient material occurred at the bottom of the bushing, there was no comparable extension of resilient material at the top of the bushing. Typically the shock impact is directed downward rather than upward. Although this obviously reduced the shock absorber effect, nevertheless its effect was better than no shock absorber.

The invention in one broad aspect is directed to a bushing for a shock absorber comprising a cylindrical tube with outer radial projections. The shape of the projections is not critical as long as they engage, grasp, grip or embed in resilient material. The projections may be studs or they may be part circular loops circumferential of the cylindrical tube. Typically projections are spaced equally circumferentially. They may be midway axially of the tube when in a single array. In two arrays they will be spaced about a third of the way in from the ends, equidistant axially from each other and opposite ends of the cylindrical tube.

In another broad aspect the invention is directed to a shock absorber comprising a metal peripheral frame spaced apart from and surrounding a planar block of resilient material contacting substantially all the inside surface of the frame. The resilient block has a cylindrical aperture to receive a pivot pin. Preferably, the cylindrical aperture comprises a cylindrical metal bushing to receive a pivot pin. The bushing is embedded in the cylindrical aperture so the planar block of resilient material contacts substantially all the outside surface of the bushing. The planar resilient block extends radially from and embeds the bushing out to the frame, which confines it. The block contacts substantially all the outside surface of the bushing and substantially all the inside surface of the frame. Preferably the bushing has radial bushing projections extending into the material and the frame has inner frame projections extending into the material. The bushing projections may be studs or may comprise at least one array of circumferential loops. Preferably the bushing is central to the resilient block. The frame may be rectangular, when each side comprises at least one projection, typically a lug, or at least one longitudinal array of loops. The shock absorber frame may be integral to a metal mounting bracket. Otherwise a wedge shaped metal corner bracket with an aperture therein to pass a bolt through is attached to each frame corner. A nut is aligned with each aperture to threadably receive the bolt. Typically the corner brackets are welded to the shock absorber frame, covering a portion of the resilient material. Each nut is welded to a corner bracket, and each nut extends into the resilient material. The planar block of resilient material may have an array of apertures/surrounding and parallel to the bushing to increase the compressibility and shock absorbing qualities of the material. The resilient material is preferably memory polyurethane elastomer.

In a third broad aspect the invention is directed to a fifth wheel trailer hitch for a pickup truck. These comprise a support frame mounted on the truck chassis through the truck bed, and a couple assembly. The couple assembly and the support frame both having a pivotal mounting operationally associated therewith. The pivotal mounting has paired shock absorbers each having a metal peripheral frame spaced apart from and surrounding a planar block of resilient material contacting substantially all the inside surface of the frame. The resilient block has a cylindrical aperture to receive a pivot pin. There are paired pivot pins to engage the apertures. Preferably each cylindrical aperture comprises a cylindrical metal bushing to receive a pivot pin. The bushing is embedded in the cylindrical aperture so the planar block of resilient material contacts substantially all the outside surface of the bushing. The resilient block is confined within its surrounding shock absorber metal frame. The shock absorber metal frames may be integral to support brackets mounted on the support frame. The shock absorber metal frames may be attached to support brackets mounted on the support frame. In either case the support brackets are preferably height adjustably mounted on the support frame. Generally the couple assembly is mounted on a cross beam having end pivot pins engaging the bushings of the shock absorbers. Usually each bushing has outer radial bushing projections extending into the material, and the shock absorber frame has inner frame projections extending into the material, which is memory polyurethane elastomer.

The difference between the current shock absorber and a bearing is that the resilient block allows the pivot pin a greater displacement than a bearing, up to forty to fifty percent of pin diameter, or twenty-five to thirty percent of bushing diameter. As those skilled in the art appreciate displacements of this size are rare but occasionally occur under extreme conditions.

DESCRIPTION OF THE PREFERRED EMBODIMENTS

Figure 1:
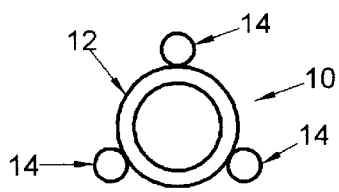
FIG. 1 is an end elevational view of a bushing of the invention.
Figure 2:
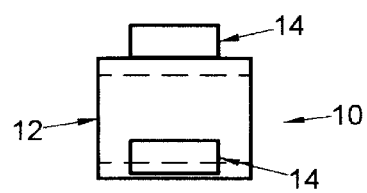
FIG. 2 is a side elevational view of the bushing of FIG. 1.
Figure 3:
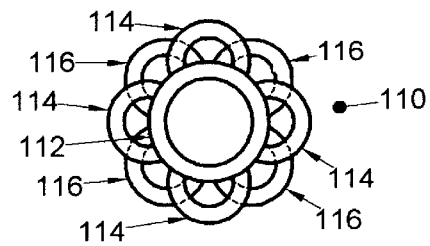
FIG. 3 is an end elevational view of another bushing of the invention.
Figure 4:
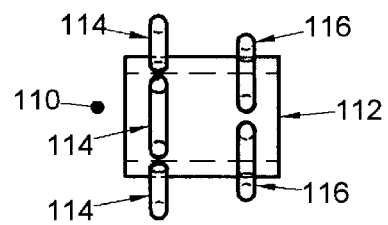
FIG. 4 is a side elevational view of the bushing of FIG. 3.
Figure 5:
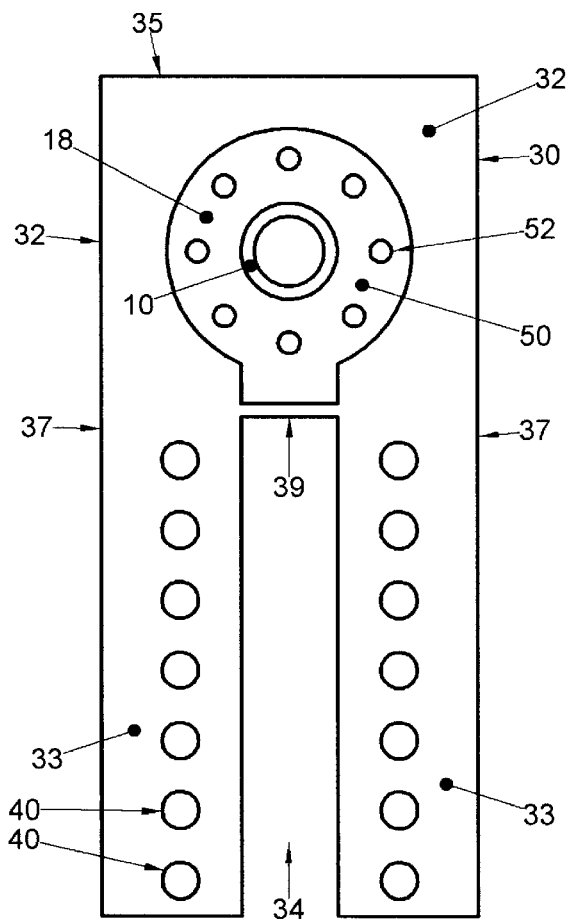
FIG. 5 is a side outer elevational view of a stanchion of the invention.
Figure 6:
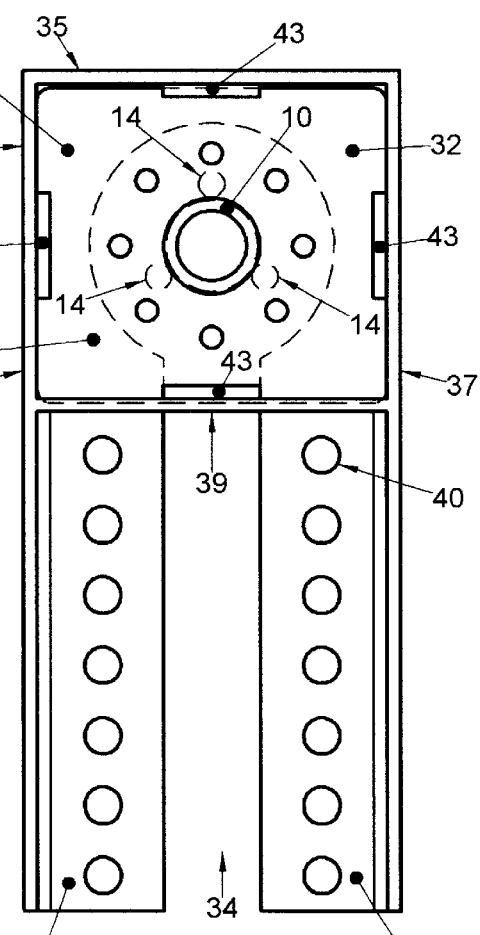
FIG. 6 is a side inner elevational view of a bracket of FIG. 5, with the resilient material omitted.
Figure 7:
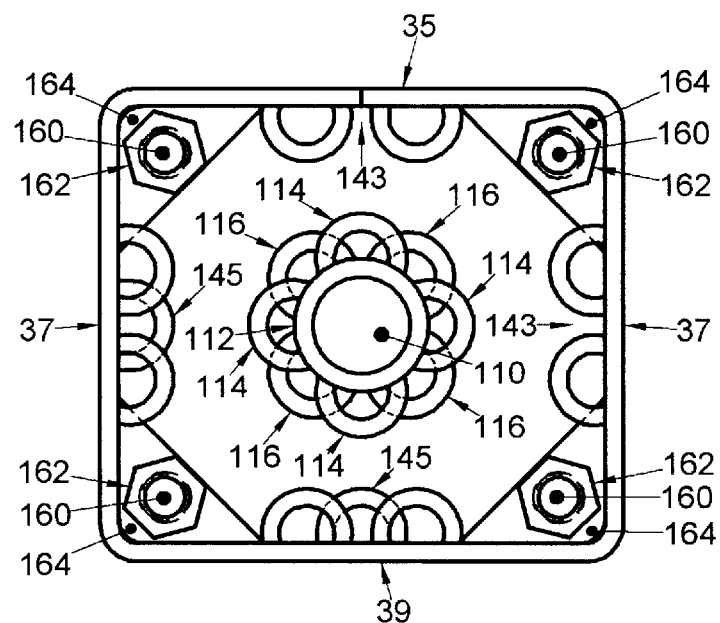
FIG. 7 is a side inner elevational view of a pivot block of the invention, with the resilient material omitted.
Figure 8:
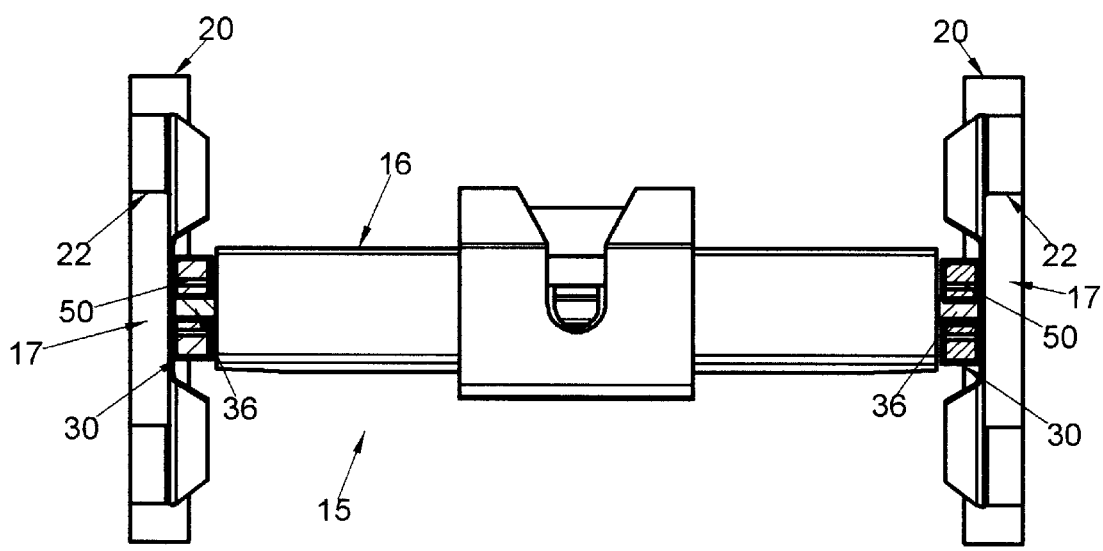
FIG. 8 is a simplified top plan part sectional view of a support structure of the invention.
Figure 9:
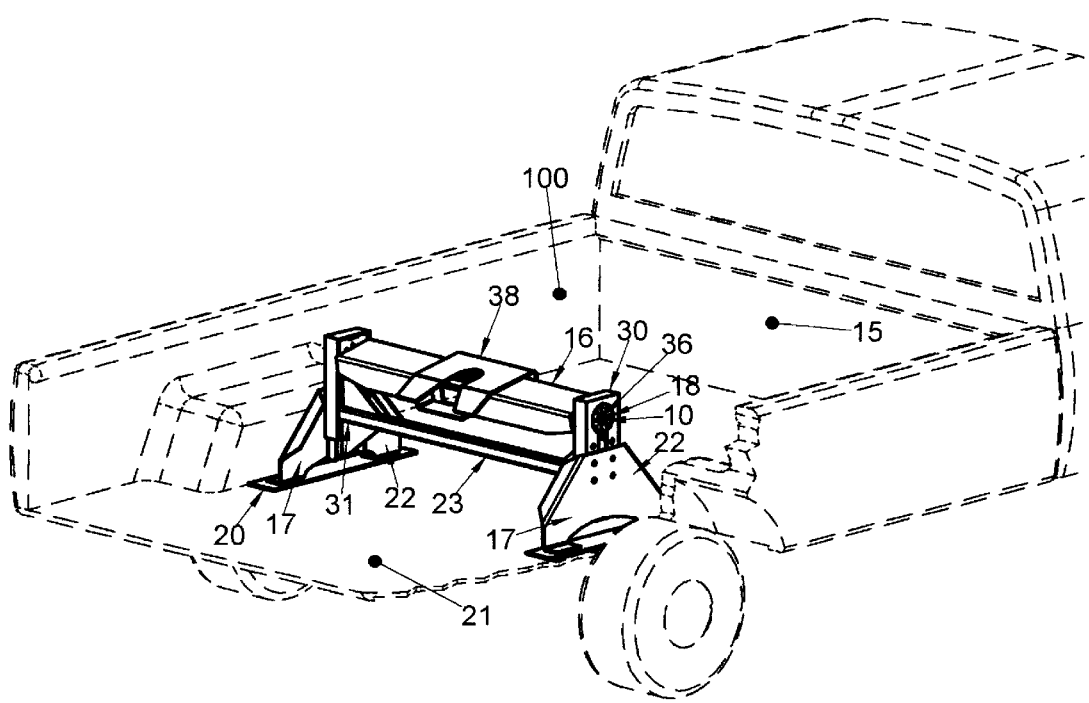
FIG. 9 is a perspective view of an embodiment of FIG. 8.

The invention is now illustrated by reference to the preferred embodiments thereof. FIGS. 1 and 2 show bushing 10 of which has cylindrical body 12 of internal diameter 1", and three studs 14 standing out about ⅜", midway of cylinder 10. FIGS. 3 and 4 show another bushing 110 with cylindrical body 112 of internal diameter 1", and four loops 114 projecting about ⅜", four more loops 116 projecting about ⅜" are staggered behind loops 114, loops 114 and 116 are spaced about a third in from the ends of body 112. Loops 114 and 116 are 3/16" wire welded to body 112. Cylindrical bodies 12 and 112's internal diameter can be varied to accommodate different diameter pins. Typically cylindrical bodies 12 and 112 have lengths between about 1" and 2". Cylindrical bodies 12 and 112, typically have radial thicknesses of from ⅛" to 5/16". Studs 14 and loops 114 and 116 serve to embed bushings 10 and 110 in memory elastomer. Loops 114 and 116 are preferred, because memory elastomer can flow through loops 114 and 116 embedding bushing 110 more strongly in the elastomer, during molding. The number of studs and loops are not critical, as those skilled in the art appreciate, they should be substantially equally spaced radially, and lengthwise of the cylinder. The advantage of studs 14 and loops 114 and 116 in bushings 10 and 110 is to spread the load more broadly and evenly into the memory elastomer. As shown in FIGS. 5 and 6, pivot blocks 30 are part of bracket 31, which has outer wall 32, split in this case into downward projections 33 by optional gap 34, it has top wall 35, side walls 37, and cross wall 39. Projections 33 have a row of aligned apertures 40 to adjustably mount bracket 31 and pivot block 30 in height-adjustable fashion. Pivot block 30 and outer wall 32 have large generally circular central aperture 18. Central aperture 18 may be other than circular, such as, for instance, square, triangular or rectangular. Disposed within aperture 18 is tubular metal bushing 10 to rotatably receive a corresponding pivot pin. Preferably bushing 10 is central of aperture 18. Bushing 10 has exterior diameter substantially less than the inside diameter of aperture 18 leaving a substantial gap. Aperture 18 leads into space 41 in the interior of pivot block 30, formed by top wall 35, side walls 37, cross wall 39 and outer wall 32. As shown in FIG. 5, bushing 10 is retained within layer 50 of resilient material which fills space 41 between bushing 10 and walls 32, 35, 37 and 39. As stated above in the absence of studs 14 and loops 114 and 116, bushing 10 breaks loose from resilient layer 50. The absence of studs 14 and loops 114 and 116 is less thus preferred, and considerably less effective, but better than no shock absorber at all. Resilient layer 50 is formed from polyurethane or any other substance having sufficient strength and rigidity to maintain bushing 10 in position, while having resilient and elastomeric properties to act as a shock absorber. Especially preferred is polyurethane memory elastomer. This material is more shock resistant than steel springs, with less fatigue. The array of small openings 52 surrounding bushing 10 may be provided, depending on the resilient material and its degree of resilience, extending through resilient layer 50. Openings 52 allow compression and extension of resilient layer 50 under stress. The distortion of resilient layer 50 absorbs shock and impact. Any convenient array, size and shape of openings 52 may be provided, depending on hardness of selected resilient layer 50. As shown openings 52 are circular and octagonally arrayed. Space 41 in FIG. 6 is filled with resilient layer 50 not shown, ribs or flanges 43 extend inward into space 41 to engage layer 50 and anchor it in place and provide rigidity under stress. Similarly bushing 10 has projections 14 on its outer surface which engage layer 50 and anchor it in place under stress. Pivot block 30 is typically 4½"×4½" and 1¾" thick, as is memory elastomer 50. For instance a ¾ ton pickup truck pulling a trailer with pinweight 1000 lbs, used a pivot block of the above dimensions, with polyurethane elastomer of durometer hardness 60 to 65, which was found satisfactory. As those skilled in the art appreciate similar materials, including elastomers of similar and equivalent properties may be used as resilient material 50 in pivot blocks 30. Hardness or rigidity of resilient material can be routinely adjusted as desired within known limits, by varying composition or treatment, as known to those skilled in the art. Pivot block walls 35, 37, 39 are welded ¼" angle iron. As in FIG. 7, pivot block 30 may be separate from bracket 31 as shown, bushing 110 with loops 114 and 116 is within aperture 118, preferably central. Loop arrays which may be a single array 143, or a double array 145, project from walls 35, 37 and 39 into space 141 and hence resilient material 50 (not shown). Loop arrays 143 and 145 project about ⅜" and are welded 3/16" wire. Pivot block 30 is attached to a suitable support bracket by bolts passing through apertures 160 to be received in nuts 162 welded to corner brackets 164, themselves welded to walls 35, 37, 39. Corner brackets 164 align with the outer surface of resilient material 50 and the outer edges of walls 35, 37 and 39. In FIG. 8, is shown a simplified support system 15, cross beam 16, which typically supports a couple assembly, has end pivot pins 36, engaging pivot blocks 30 and resilient material 50, by bushings 10 or 110 (not shown). Pivot blocks 30 are supported by support arms or legs or pedestals 17, which include side rails or plates 22, and bed rails or base plate 20, for attachment to a truck chassis through the truck bed. Structure system 15 is simplified, because as those skilled in the art know, interminable structural variation is well known, without changing the basic structure. FIG. 9 shows an embodiment of the invention on a pickup truck, the nature of the truck is not important for the present invention and it will be seen that any vehicle providing a suitable mount surface will serve. Hitch 100 comprises support system 15, which has in general two spaced apart support arms 17, with beam 16 spanning support arms 17 in cross orientation relative to the vehicle. Beam 16 has central couple assembly 38 to receive mounting ball, shoe or kingpin of a trailer (not shown). Beam 16 is rotatably journalled within corresponding apertures 18 of support arms 17 for pivotal movement about a horizontal axis transverse to the longitudinal axis of the towing vehicle. This pivotal movement permits relative movement between the trailer (not shown) and the towing vehicle about a vertical plane, for instance, when the respective vehicles experience different degrees of inclination in the front to rear direction. Side rails or plates 22 each have base plate or bed rail 20 for attachment to truck chassis (not shown) through truck bed 21 or similar surface(s), typically by bolts (not shown). Mounted on each side rail 22 is pivot block 30, described above in detail. As shown pivot blocks 30 extend from the uppermost portion of side rails 22. As shown pivot blocks 30 are mounted by brackets 31, which are often, but not always, part of optional saddle bracket 23. It is contemplated that other arrangements may be provided where blocks 30 are mounted on side rails 22 at another location. Pivot blocks 30 each have apertures 18 extending through them to receive pivot pins 36 in bushings 10. It will be seen that in use layer 50 will absorb the shock and vibration transmitted in either a horizontal, vertical or intermediate plane by the trailer to the towing vehicle. Further the twisting movement of beam 16 caused by relative side to side rolling motion between the trailer and the towing vehicle will be absorbed to a degree by resilient layer 50. Generally in use a face plate (not shown) is secured to the end of pivot pin 36 by a bolt threaded into the outer end of pivot pin 36. It is generally expected that bushings 10 and 110 will displace approximately ⅜" to ½" distorting resilient material 50, during shock absorption. It is contemplated that the above described shock absorbers will be suitable for pickup trucks in the ½" ton, ¾" ton, and 1 ton cargo range, absorbing about half of the usually experienced shock. The necessary hardness of the resilient material can be routinely established by those skilled in the art. Similar shock absorbers can be designed suitable for larger trucks. Primarily the hardness and thickness of the resilient material will be increased with increasing size of truck and trailer, to accommodate greater shock impact. The height and width of the resilient material may also be increased. Generally the maximum distortion of the resilient material should be less than 40 or 50%.

The above described arrangements absorb side to side angular movement (that is a roll between trailer and towing vehicle) and reduce the need for a double pivot hitch for towing a trailer.

It is seen that in the above description, the hitch has pins extending from its central beam receivable within bushings in the supporting arms. As those skilled in the art will readily appreciate the reverse situation is possible, with pivot pins mounted on the supporting arms extending inwards and received in bushings within the central beam. The bushings are mounted or embedded within a resilient shock absorbing member to receive the pin. Generally the shock absorbing member has a toroidal portion surrounding the bushing, but the entire shape of the resilient member need not be toroidal. As shown the shock absorbing member fits into a surrounding metal frame, preventing rotation of the shock absorbing member. Although as shown the frame is square or rectangular, this is merely convenient, as long as the resilient member is held solidly within a frame so that it cannot rotate or move with respect to the frame, the shape of the frame is immaterial.

Bushings 10 or 110 may in a further embodiment be dispensed with pins 36 being rotatably received within a suitable aperture within the resilient member. In practice this would cause excessive wear to the resilient member and thus is much less preferred although it still functions as a shock absorber, and is better than no shock absorber. As those skilled in the art readily appreciate a suitable wear resistant material could do duty as the resilient member, and provide an effective optional arrangement having reduced manufacturing costs.

As those skilled in the art would realise these preferred described details and materials and components can be subjected to substantial variation, modification, change, alteration, and substitution without affecting or modifying the function of the described embodiments. Although particular embodiments of the invention have been described above, including several specific optional features, it is not limited thereto, and it will be apparent to persons skilled in the art that numerous modifications and variations form part of the present invention insofar as they do not depart from the spirit, nature and scope of the claimed and described invention.

I claim:

1. Shock absorber comprising a metal peripheral frame spaced apart from and surrounding a planar block of resilient material contacting substantially all the inside surface of said frame, said resilient block having a cylindrical aperture to receive a pivot pin, wherein said cylindrical aperture comprises a cylindrical metal bushing to receive a pivot pin, said bushing being embedded in said cylindrical aperture so said planar block of resilient material contacts substantially all the outside surface of said bushing, wherein said bushing has outer radial bushing projections extending into said material and said frame has inner frame projections extending into said material.

2. Shock absorber of claim 1, wherein said bushing projections comprise at least one array of circumferential loops and said frame is rectangular and each side comprises at least one longitudinal array of loops.

3. Shock absorber of claim 2, wherein said frame is integral to a metal mounting bracket.

4. Shock absorber of claim 2, wherein each corner of said rectangular frame has a wedge shaped internal corner bracket, having an aperture therein to pass a bolt through, each said corner bracket having a nut aligned with said aperture to threadably receive said bolt.

5. Shock absorber of claim 2, wherein said corner brackets are welded to said frame, covering a portion of said resilient material, and each said nut is welded to said corner bracket, and each said nut extends into said resilient material.

6. Shock absorber of claim 5, wherein said resilient material is memory polyurethane elastomer.

* * * * *